US007385787B1

(12) United States Patent
Leabch

(10) Patent No.: US 7,385,787 B1
(45) Date of Patent: Jun. 10, 2008

(54) LOADBEAM WITH IMPROVED PARTIAL ETCHING GEOMETRY

(75) Inventor: Craig A. Leabch, Saint Cloud, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 324 days.

(21) Appl. No.: 10/967,514

(22) Filed: Oct. 18, 2004

(51) Int. Cl.
G11B 5/596 (2006.01)
(52) U.S. Cl. .................................. 360/244.8
(58) Field of Classification Search ............ 360/244.8
See application file for complete search history.

(56) References Cited

U.S. PATENT DOCUMENTS

| 5,126,904 | A | * | 6/1992 | Sakurai | 360/244.2 |
|---|---|---|---|---|---|
| 5,461,525 | A | | 10/1995 | Christianson et al. | |
| 5,812,342 | A | * | 9/1998 | Khan et al. | 360/244.9 |
| 5,850,319 | A | | 12/1998 | Tangren | |
| 5,914,835 | A | | 6/1999 | Girard et al. | |
| 5,933,294 | A | | 8/1999 | Yanagisawa | |
| 5,949,617 | A | * | 9/1999 | Zhu | 360/244.8 |
| 6,141,187 | A | * | 10/2000 | Wong et al. | 360/244.8 |
| 6,147,839 | A | | 11/2000 | Girard | |
| 6,532,135 | B1 | | 3/2003 | Chen et al. | |
| 6,798,618 | B2 | * | 9/2004 | Takagi et al. | 360/244.5 |
| 7,064,931 | B2 | * | 6/2006 | Hutchinson | 360/244.8 |
| 7,136,260 | B2 | * | 11/2006 | Oh et al. | 360/244.8 |
| 2002/0044371 | A1 | * | 4/2002 | Bement et al. | 360/75 |
| 2002/0051319 | A1 | * | 5/2002 | Takagi et al. | 360/244.9 |
| 2003/0058579 | A1 | * | 3/2003 | Danielson et al. | 360/244.8 |
| 2004/0061975 | A1 | * | 4/2004 | Boutaghou et al. | 360/244.8 |
| 2004/0264054 | A1 | * | 12/2004 | Hutchinson | 360/244.8 |

OTHER PUBLICATIONS

Yoon, et al., Design and Dynamic Analysis of Suspension for Dual Actuator Type HDD, *J. Info. Storage Proc. Syst.*, vol. 3, 47-51, 2001.
Niu, et al., *A PZT Micro-Actuated Suspension for High TPI Hard Disk Servo Systems*, IEEE Transactions on Magnetics, vol. 36, No. 5, pp. 2241-2243, Sep. 2000.
Kilian, et al., *Suspension modeling and optimization using finite element analysis*, Tribology International 36 (2003), pp. 317-324.

* cited by examiner

Primary Examiner—Jefferson Evans
(74) Attorney, Agent, or Firm—Faegre & Benson LLP

(57) ABSTRACT

A head suspension for supporting a read/write head in a dynamic rigid disk data storage device and applying a load force on the read/write head in a load direction when the storage device is in operation, the suspension comprising an elongated loadbeam portion extending along a longitudinal axis having a bending spring rate in the load direction. The loadbeam comprises a rigid mounting portion at a proximal end of the loadbeam portion for attaching the loadbeam portion to an actuating mechanism, a rigid load portion at a distal end of the loadbeam portion for supporting an assembly configured to carry the read/write head, and a spring portion integrally formed with the mounting region and load region and having partially etched regions with a thickness that is smaller than the mounting region and load region. The spring portion appreciably affects the bending spring rate. The boundary between the spring portion and mounting portion comprises at least a first segment that is not perpendicular to the longitudinal axis. The boundary between the spring portion and load portion comprises at least a second segment that is not perpendicular to the longitudinal axis.

20 Claims, 13 Drawing Sheets

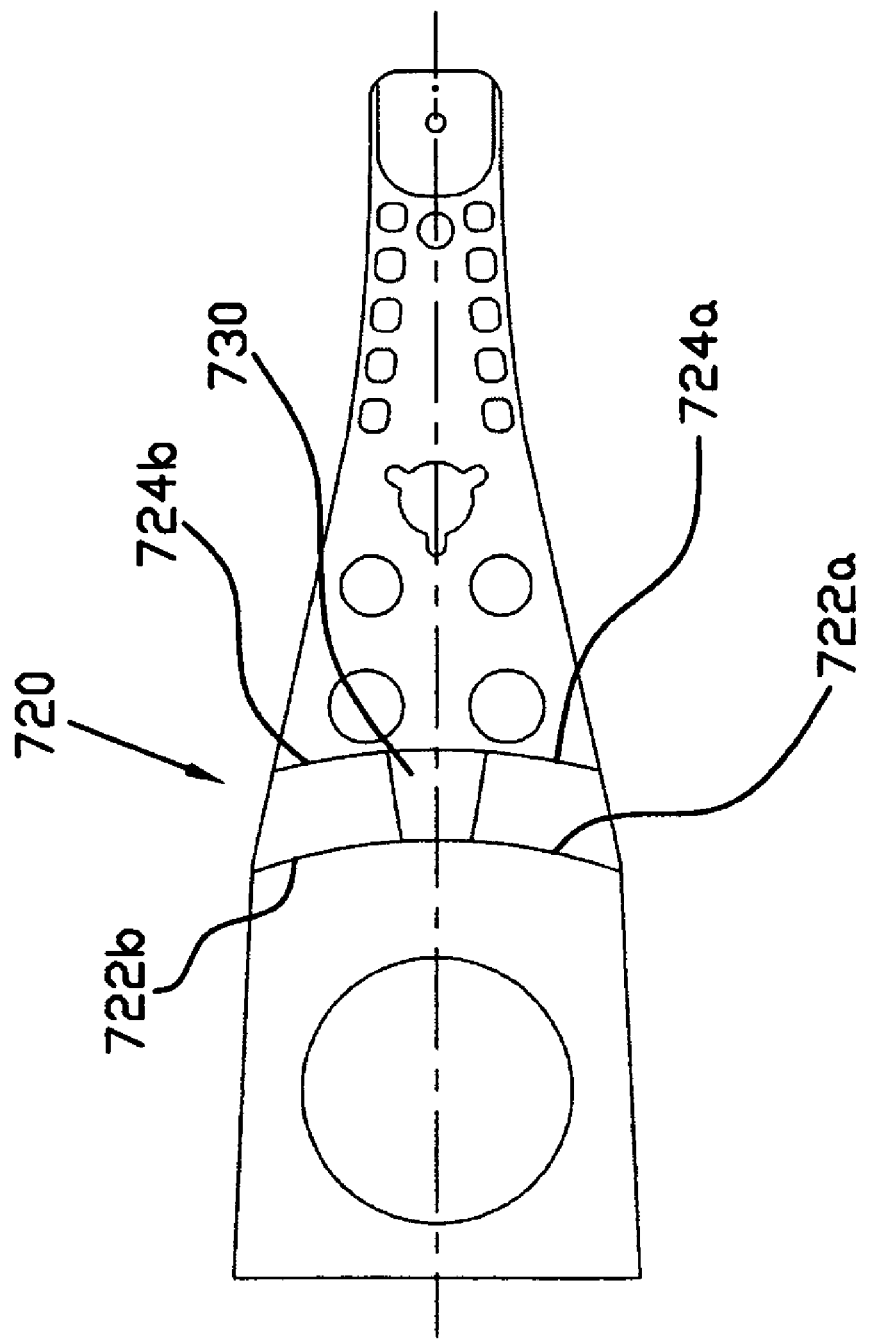

LOADBEAM WITH IMPROVED PARTIAL ETCHING GEOMETRY

FIELD OF THE INVENTION

The invention relates generally to head suspension systems in rigid disk storage devices. More particularly, the invention relates to a spring region structure for a loadbeam.

BACKGROUND OF THE INVENTION

In a dynamic rigid disk storage device, a rotating disk, such as a magnetic disk, is used to store information. Rigid disk storage devices typically include a frame to provide attachment points and orientation for other components, and a spindle motor mounted on the frame for rotating the disk. A read/write element is formed on a "head slider" for reading and writing data from and to the disk surface. The head slider typically is supported and oriented relative to the disk by a head suspension assembly. The head suspension assembly provides both the force and compliance necessary for proper head slider operation. The head suspension assembly typically comprises a load beam and flexure, which can be attached to, or integrally formed with, the load beam. The head suspension assembly typically is attached to an actuator arm or E-block, which is in turn attached to an actuator. As the disk in the storage device rotates beneath the head slider and head suspension, the air above the disk also rotates, thereby creating an air bearing which acts with an aerodynamic design of the head slider to create a lift force on the head slider. The balance between the lift force and load force exerted by the head suspension substantially determines the distance, or "flying height" between the read/write head and the surface of the disk.

The trend in the evolution of dynamic rigid disk storage devices is toward higher data storage density, higher read/write speed, and a more efficient manufacturing process coupled with higher quality products. To achieve high data storage density, the read/write head must be close to the disk surface. That is, the flying height must be small. For example, for a data density of about 7.8 Gigabytes/cm$^2$ or greater on a magnetic hard drive, the flying height of the slider is typically on the order of 10 nm or less.

To consistently attain such small flying heights, the performance parameters of the components of the suspension assembly must be controlled carefully. One parameter is the spring force or vertical load, often referred to as the "gram load", that the head suspension assembly exerts on the slider head to balance the "lift" forces created by the air passing between the slider and the spinning disk. The gram load is typically set by the properties of the spring region (also referred to as the "radius region") of the loadbeam. In a typical loadbeam, the spring region is a portion of reduced material thickness between a rigid load portion and a rigid mounting portion for attaching the loadbeam to an actuator. It is therefore desirable to have small variability in gram load. Depending on the spring portion forming process and the starting material used, the gram load may decrease to a lower level over time or as the loadbeam is deformed ("backbent") beyond its designed normal operating range. It is desirable to reduce the amount of this decrease ("load loss") and to reduce the manufacturing influence variability of the load loss. Another important parameter is the frequency response function ("FRF"), which is the amount of gain of the read/write head as a function of the frequency of an oscillating driving force, such as the force from the vibrations of a disk drive. Typically, the FRF has one or more resonant peaks over the range of frequencies of interest. That is, the head suspension resonates at certain frequencies. It is thus typically desirable to have fewer FRF peaks and to control their frequencies and gain at the intended rigid disk data storage devices operating frequencies. Generally, it is desirable to have FRF peaks of high frequencies, preferably higher than the operating frequencies of the storage devices.

In one common loadbeam manufacturing process, the thickness in the spring portion is reduced by chemically etching away part of the material in the spring portion. Ideally, the partial etching would proceed evenly, and the thickness of the remaining material ("remaining material thickness", or "RMT") would be uniform throughout the spring region. In reality, however, the etching rate is typically higher at the edges of the etching zone than at the center of the zone, as shown by the example illustrated in FIG. 11. As a result, the regions 1126 in the spring portion 1120 near the boundary between the spring portion 1120 and the mounting portion 1116, and between the spring portion 1120 and the load portion 1118, tend to be thinner than the middle portion 1128 of the spring region 1120. In a prior art loadbeam, the boundaries between the mounting portion and the partially etched spring portion and between the load portion and the spring portion are parallel to each other and parallel to the torque bending the loadbeam when the load force is applied to the head. In other words, the boundaries are perpendicular to the longitudinal axis of the loadbeam. With this configuration, gram load loss and product variability remain significant concerns. There is thus a need for a head suspension with improved characteristics, in particular reduced gram load loss and reduced variability in performance parameters.

SUMMARY OF THE INVENTION

Generally, the invention provides a head suspension for supporting a read/write head in a dynamic rigid disk data storage device and applying a load force on the read/write head in a load direction when the storage device is in operation. The suspension comprises an elongated loadbeam portion extending along a longitudinal axis and comprising a rigid mounting portion at a proximal end of the loadbeam portion for attaching the loadbeam portion to an actuating mechanism, a rigid load portion at a distal end of the loadbeam portion for supporting an assembly configured to carry the read/write head, and a resilient spring portion connected to the mounting region at a first boundary and the load region at a second boundary. The spring portion is substantially determinative of the bending spring rate of the loadbeam portion. At least a portion of each of the first and second boundaries is not substantially perpendicular to the longitudinal axis.

The resilient spring portion can be a partially etched region integrally formed with the mounting portion and load portion. The first and second boundaries can include arcuate or straight segments, such as concentric circular arches and V-shaped segments. The load arm portion can also include an aperture defined at least in part by the spring portion.

The invention also provides a method for making a head suspension. The method comprises forming a rigid mounting portion for attachment to an actuating mechanism, forming a rigid load portion for supporting an assembly configured to carry the read/write head, and forming (for example, by etching) a resilient spring portion connected to the mounting region at a first boundary and the load region at a second boundary such that the mounting, load and spring portions form an elongated loadbeam portion extending along an longitudinal axis. The spring portion is substantially determinative of the bending spring rate of the loadbeam, and each of the first and second boundaries comprises a segment not substantially perpendicular to the longitudinal axis.

BRIEF DESCRIPTION OF THE DRAWINGS

Other objects and advantages of the invention will become apparent upon reading the following detailed description and upon reference to the drawings in which:

FIG. 7 schematically illustrates a head suspension in a fourth embodiment of the invention;

Figure 1:
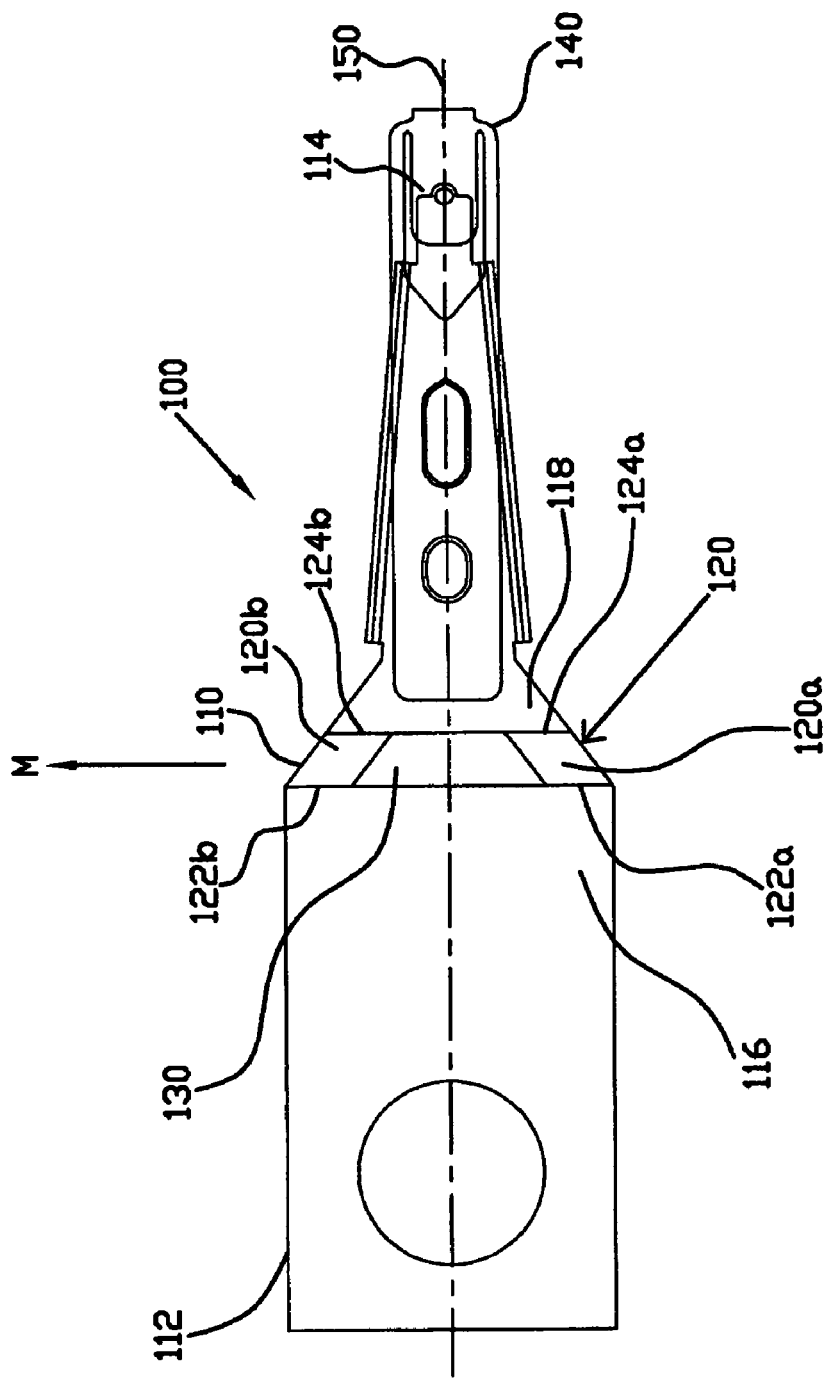
FIG. 1 schematically illustrates a prior art head suspension.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

FIG. 1 schematically illustrates a prior art head suspension, and FIGS. 2-4 and 7-10 schematically illustrate several embodiments of the invention, with like components labeled with like numerals except the first digit, which corresponds to the figure number.

Figure 2:
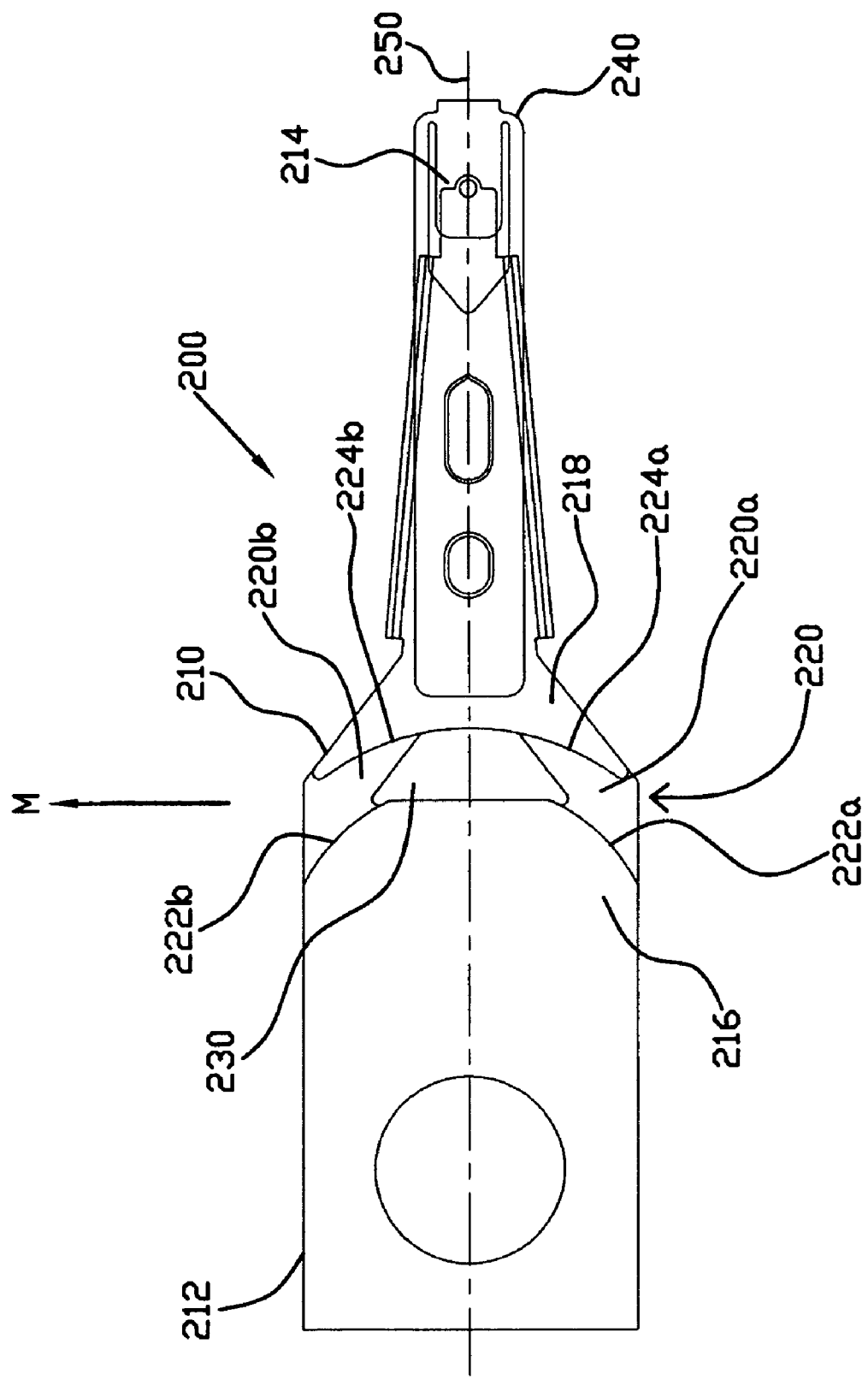
FIG. 2 schematically illustrates a head suspension in a first embodiment of the invention.

Referring to FIG. 2, a head suspension 200 according to a first embodiment of the invention includes an elongated loadbeam portion 210 having a proximal end 212 and distal end 214. The loadbeam portion 210 has an elongated shape and extends along a longitudinal axis 250. The loadbeam portion 210 includes a baseplate 216 at the proximal end 212 for mounting the loadbeam portion 210 to an actuating mechanism (not shown), such as the pivot axis of an actuator motor, and a rigid load portion 218 at the distal end 214 for supporting an assembly 240 that is configured to carry the read/write head. The assembly 240 can be a flexure with a head gimbal assembly or any other suitable structure for positioning the read/write head.

The loadbeam portion 210 further includes a resilient portion 220 (also known as the radius spring region), which includes partially etched portions 220a and 220b that in the illustrated embodiment are formed integrally with the rigid mounting and load portions 216 and 218. An aperture 230 is formed by the partially etched portions 220a and 220b, and the rigid mounting and load portions 216 and 218. In other embodiments (not shown), the resilient portion is formed as a separate hinge member that is attached to separately formed mounting regions and loadbeams. The resilient portion 220 is resilient compared to the mounting and load portions not merely because the combined width of portions 220a and 220b is smaller than the width of the mounting portion 216 or load portion 218; it is also because the bending stiffness per unit width of the resilient portion 220 is smaller than that of the other two portions due to structural factors, including the difference in thickness. The bending stiffness per unit width of the resilient portion 220 can also be made smaller by using a material with a smaller elastic modulus than the other portions or modifying (e.g., by heat treatment) the elastic modulus of a spring region integrally formed with the mounting and load regions. In addition, the mounting portion and/or load portion typically have rails (not shown) formed on both sides to increase the stiffness of those portions.

The boundaries between the spring portion 220 and the mounting portion 216 and between the spring portion 220 and the load portion 218 each include segments 222a, 222b, 224a and 224b, that are not perpendicular to the longitudinal axis 250. The orientations of the boundaries can be alternatively described as follows: The head suspension, supported and acted upon by an actuator, is designed to apply a load force on the read/write head in a load direction (typically normal to the surface of the media disk) to maintain the desired flying height. The forces, including the reaction force from the head, experienced by the head suspension create a bending moment (labeled "M" in FIGS. 1-4) that tends to flex the loadbeam portion 210. The segments 222a, 222b, 224a and 224b according to the invention are not parallel (including anti-parallel) to, but at an angle with, the direction of M.

The configuration of the loadbeam portion 200 is thus contrasted with the configuration of the prior art loadbeam 100 shown in FIG. 1. In the prior art loadbeam, the boundaries between the spring portion 120 and the mounting portion 116 and the load portion 118 are perpendicular to the longitudinal axis 150, or parallel to the bending moment M. It is thought that in the prior art configuration, the over-etched regions near each edge of the partial etch are substantially concentrated along lines upon which the stress created by the bending acting is the greatest and that such a configuration contributes to the load loss and other undesirable properties. It is further thought that orienting the lines of over-etched regions at an angle from the bending moment (and the longitudinal axis) serves to distribute the over-etched regions in a way that avoids concentrating bending stress along the weakest lines, thereby improving the performance of the head suspension.

Figure 10:
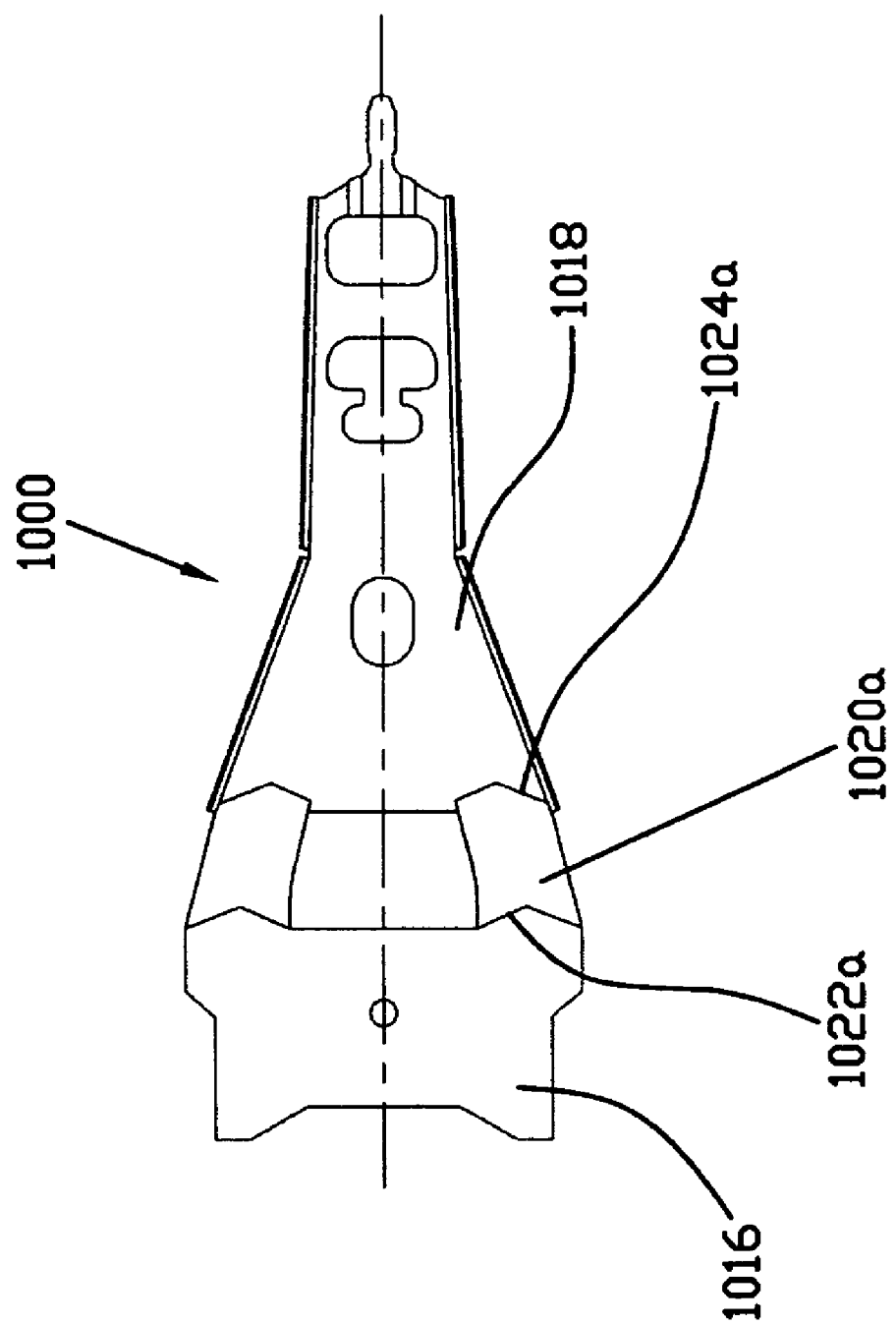
FIG. 10 schematically illustrates a head suspension in a seventh embodiment of the invention.
Figure 11:
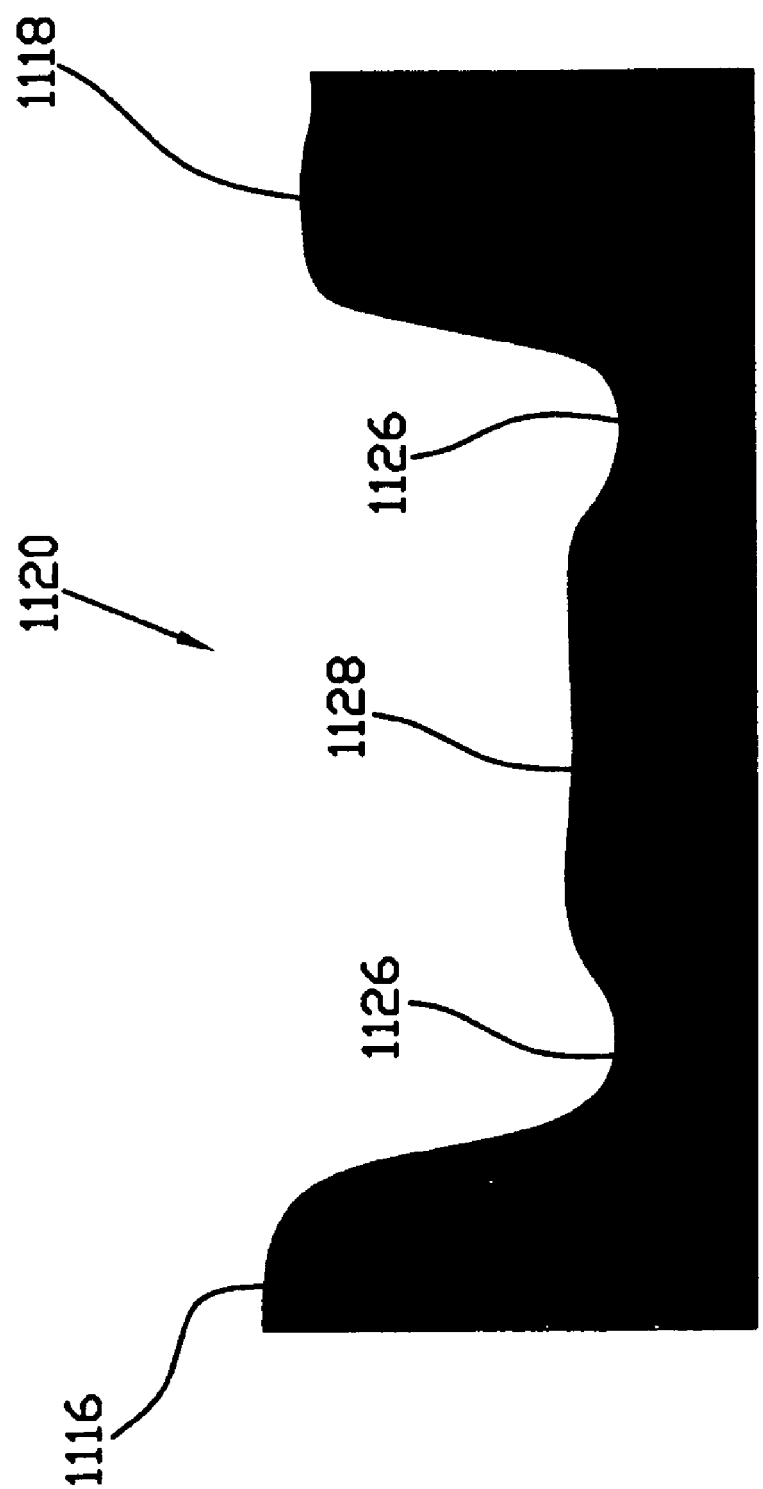
FIG. 11 illustrates a scanned depth profile of a partially etched spring region, with the scan direction normal to the edges of the partially etched region.

The segments 222a, 222b, 224a and 224b in the embodiment shown in FIG. 2 are arcuate and form patterns that curve towards the mounting portion. Other configurations can also be used. For example, straight, or linear, segments may be used, as shown by segments 322a, 322b, 324a, and 324b in FIG. 3. Complex shapes can be used in the segment also, such as the V-shaped segments (or chevrons) 422a, 422b, 424a, and 424b in FIG. 4. In this illustrative embodiment, within each portion 420a or 420b, the pair of V-shaped segments (e.g., 422a and 424a) on opposite sides of the portion (e.g., 420a) are both oriented in the same direction, with the apexes pointed towards the mounting region and offset from each other along the longitudinal axis 450. In another similar embodiment, as shown in FIG. 10, the spring portion 1020a of the suspension 1000 form offset V-shaped boundaries 1022a and 1024a with the mounting portion 1016 and load portion 1018, respectively. The apexes of the V-shaped boundaries 1022a and 1014a in this case point towards the load portion 1018.

As further examples, the arcuate segments can be concentric circular arches such as segments 722a, 722b, 724a, and 724b in FIG. 7. The boundaries between the spring portion and the mounting portion, and between the spring portion and the load portion, can also bend in opposite directions, as shown by segments 822a, 822b, 824a, and 824b in FIG. 8 and segments 922a, 922b, 924a and 924b in FIG. 9.

Referring again to FIG. 2, the two portions, 220a and 220b, form part of the perimeter of an aperture 230 in the loadbeam portion 210. The aperture, if any, can take on a variety of shapes, as shown by the examples 230, 330, 430, 730, 830 and 930 in FIGS. 2-4 and 7-10, respectively, as dictated by the needs of particular applications. The perimeter of the aperture 230 can additionally be partially formed by both the mounting portion and load portion, as shown by the examples in FIGS. 2, 4 and 7-9, or only one of the two, as shown by the example in FIG. 3. The aperture 230 can also reside entirely with in the spring region.

The resilient spring portion 220, 320, 420, 720, 820, 920 and 1020 in the illustrative embodiments are symmetrical, possessing mirror symmetry with respect to a plane that passes through the longitudinal axis of the loadbeam and perpendicular to the bending moment (or passes through the vector representing the load force direction exerted on the read/write head.) In other embodiments of the invention (not shown in the drawings), the resilient portions can further be bent such that the mounting portion and load portion are oriented at an angle from each other about an axis parallel to the bending moment.

The configuration of the partially-etched radius regions can be applied to suspensions made of any suitable material, such as stainless steel and copper. For example, integrated lead suspensions, and associated components (e.g., integrated lead flexures), which are well known and disclosed, for example, in the U.S. Pat. Nos. 5,893,193, 5,844,751 and 5,982,584, can be used. Briefly, these suspensions and components include a copper or copper alloy conductor layer and a stainless steel layer or other spring metal base layer separated by a layer of polyimide or other insulator. Electrical leads used to conduct signals between the read/write head supported by the suspension and the disk drive electronics are formed from the conductor layer.

EXAMPLES

Measurements have shown that head suspensions made according to the invention have certain improved characteristics over the prior art devices. For example, Table I lists the spring rates and their standard deviations for the suspensions shown in FIGS. 1-4, respectively.

TABLE I

Figure 3:
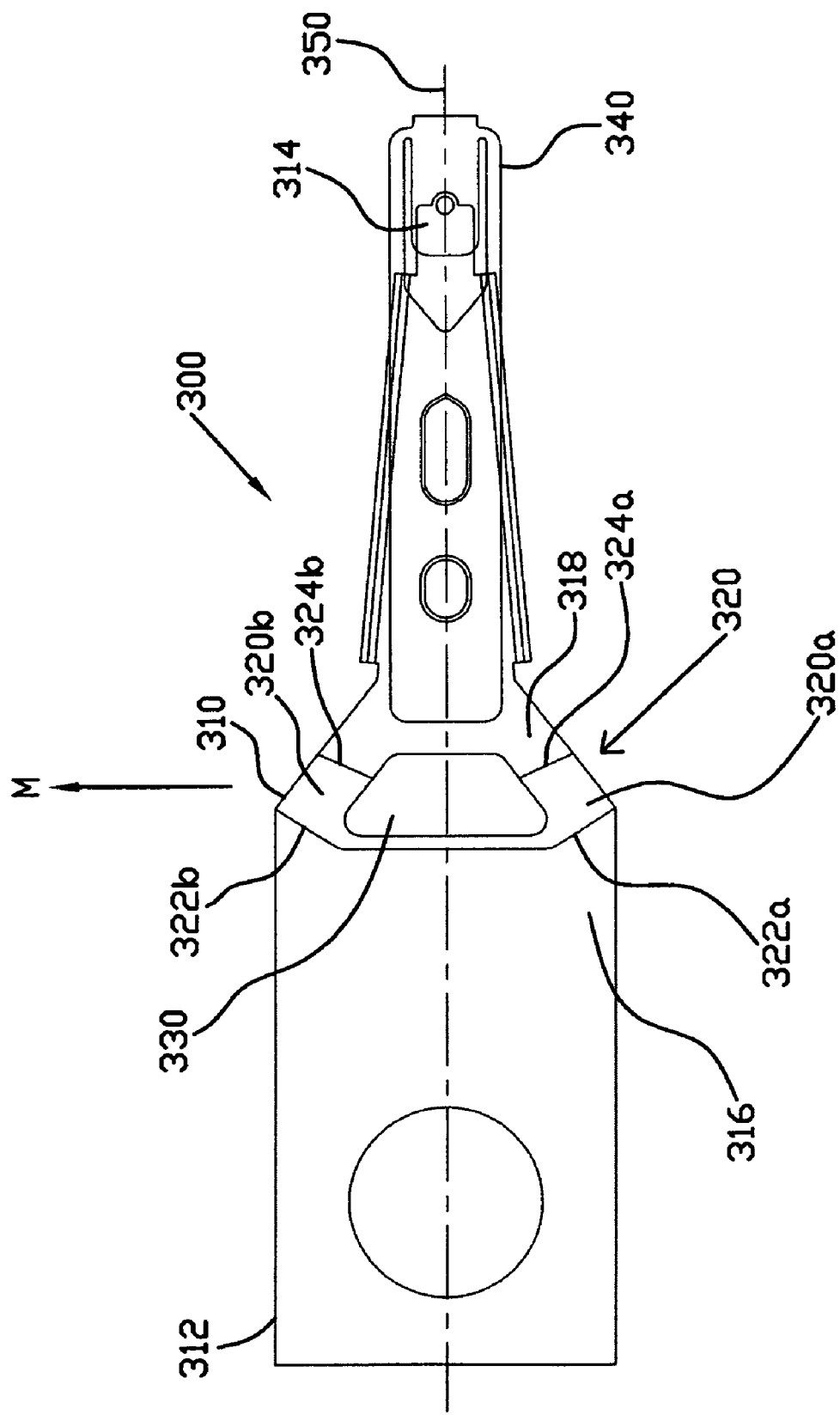
FIG. 3 schematically illustrates a head suspension in a second embodiment of the invention.
Figure 4:
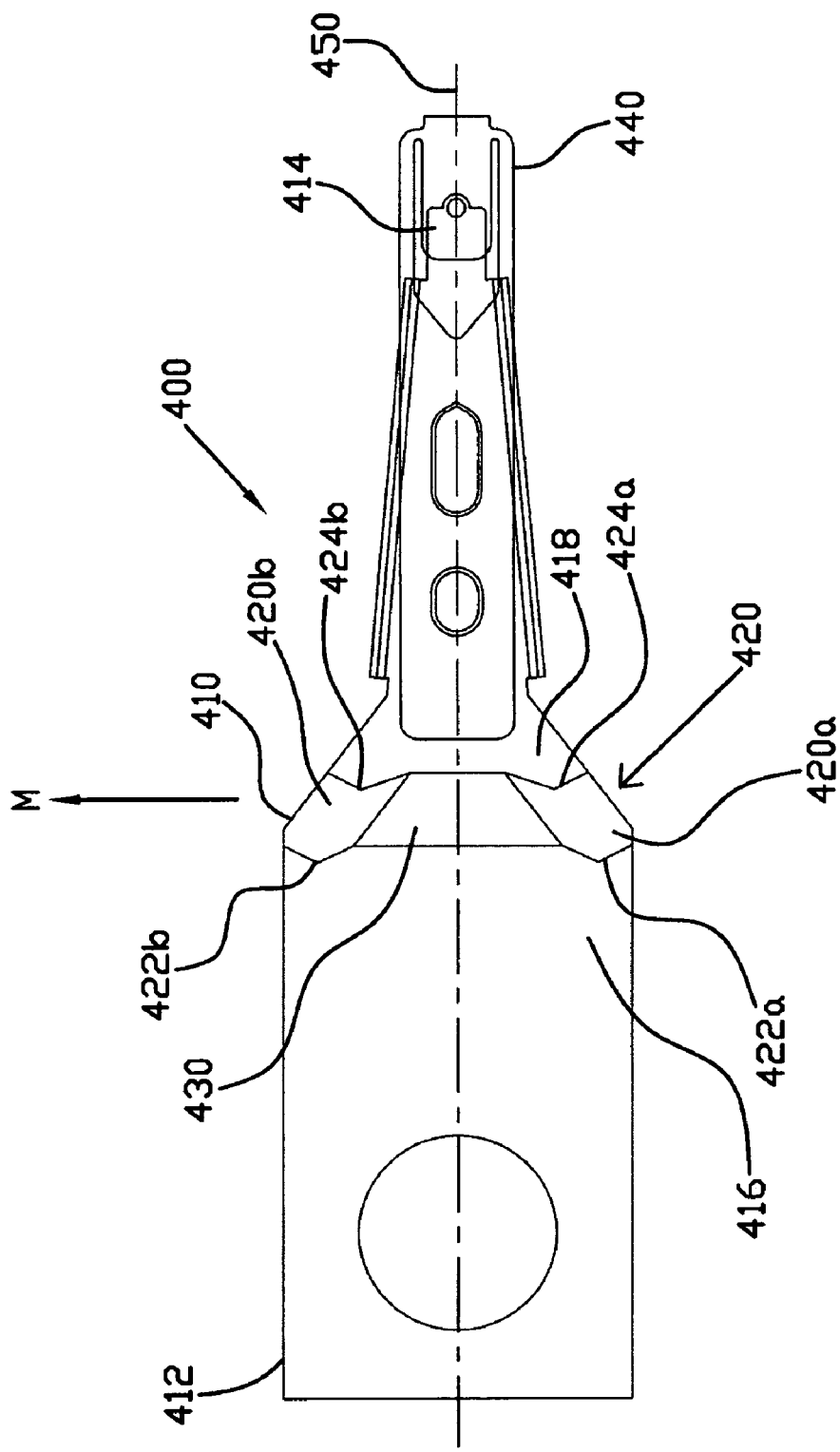
FIG. 4 schematically illustrates a head suspension in a third embodiment of the invention.

| Suspension in: | Average Spring Rate N/mm | Standard Deviation N = 15 |
|---|---|---|
| FIG. 1 (Prior Art) | 12.91 | 1.43 |
| FIG. 2 | 13.60 | 1.01 |
| FIG. 3 | 12.51 | 1.17 |
| FIG. 4 | 13.44 | 0.80 |

Thus, the head suspensions made according to the invention, especially those with the spring portions having offset-chevron-shaped edges, show a tight distribution of spring rate.

Figure 5A:
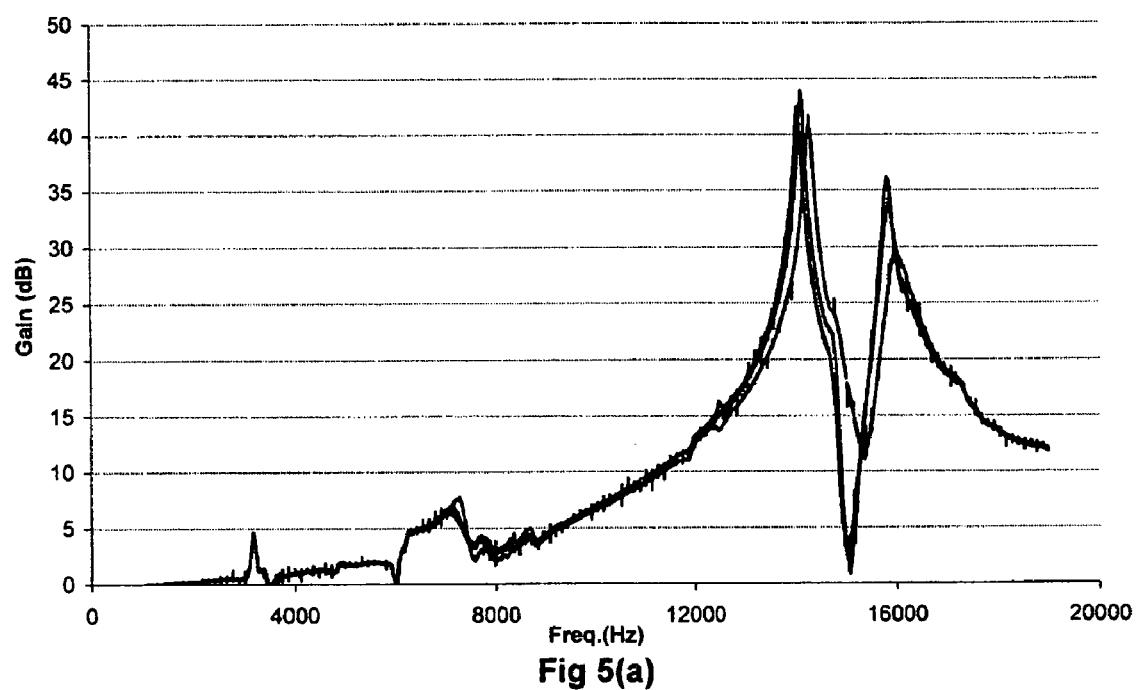
FIG. 5(a) shows a frequency response function plot for a prior art head suspension of the type shown in FIG. 1.
Figure 5B:
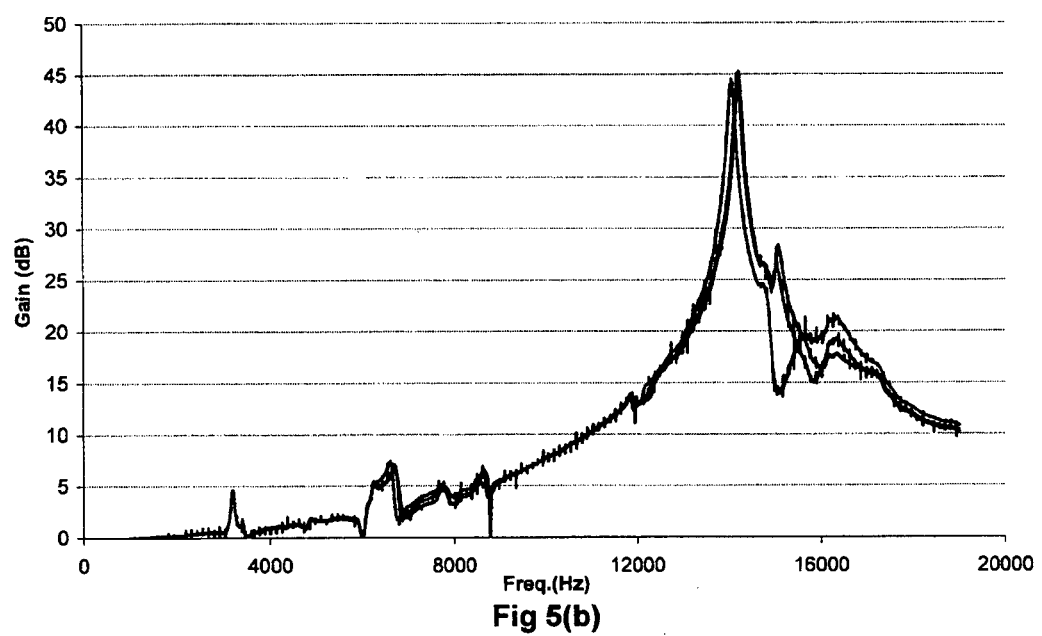
FIG. 5(b) shows a frequency response function plot for a head suspension of the type shown in FIG. 4.

FIGS. 5(a) and 5(b) show, respectively, the FRFs for the prior art suspensions shown in FIG. 1 and the suspensions shown in FIG. 4. Both suspensions show a resonance peak slightly below 15,000 Hz. The prior art device also exhibits a pronounced secondary peak above 15,000 Hz. The device shown in FIG. 4, in contrast, exhibits a much lower secondary peak. The resonance behavior is thus improved in the head suspension according to the invention.

Figure 6A:
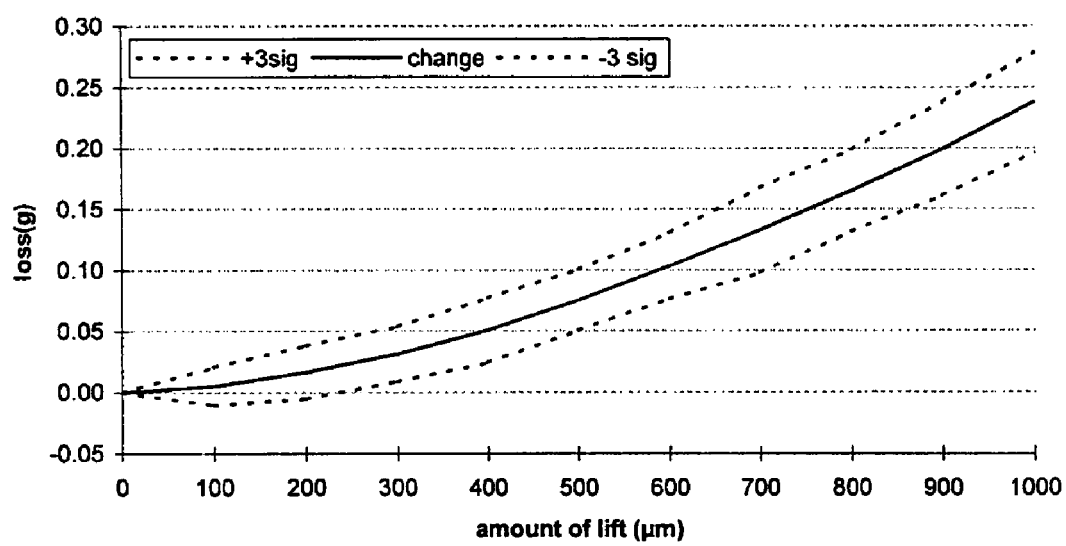
FIG. 6(a) shows a gram load loss plot for a prior art head suspension of the type shown in FIG. 1.
Figure 6B:
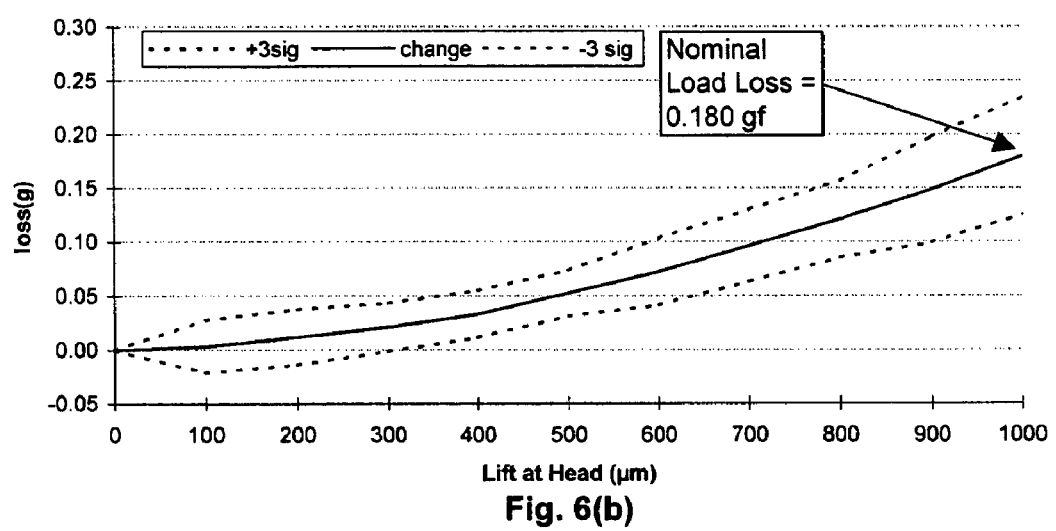
FIG. 6(b) shows a gram load loss plot for a head suspension of the type shown in FIG. 4.
Figure 8:
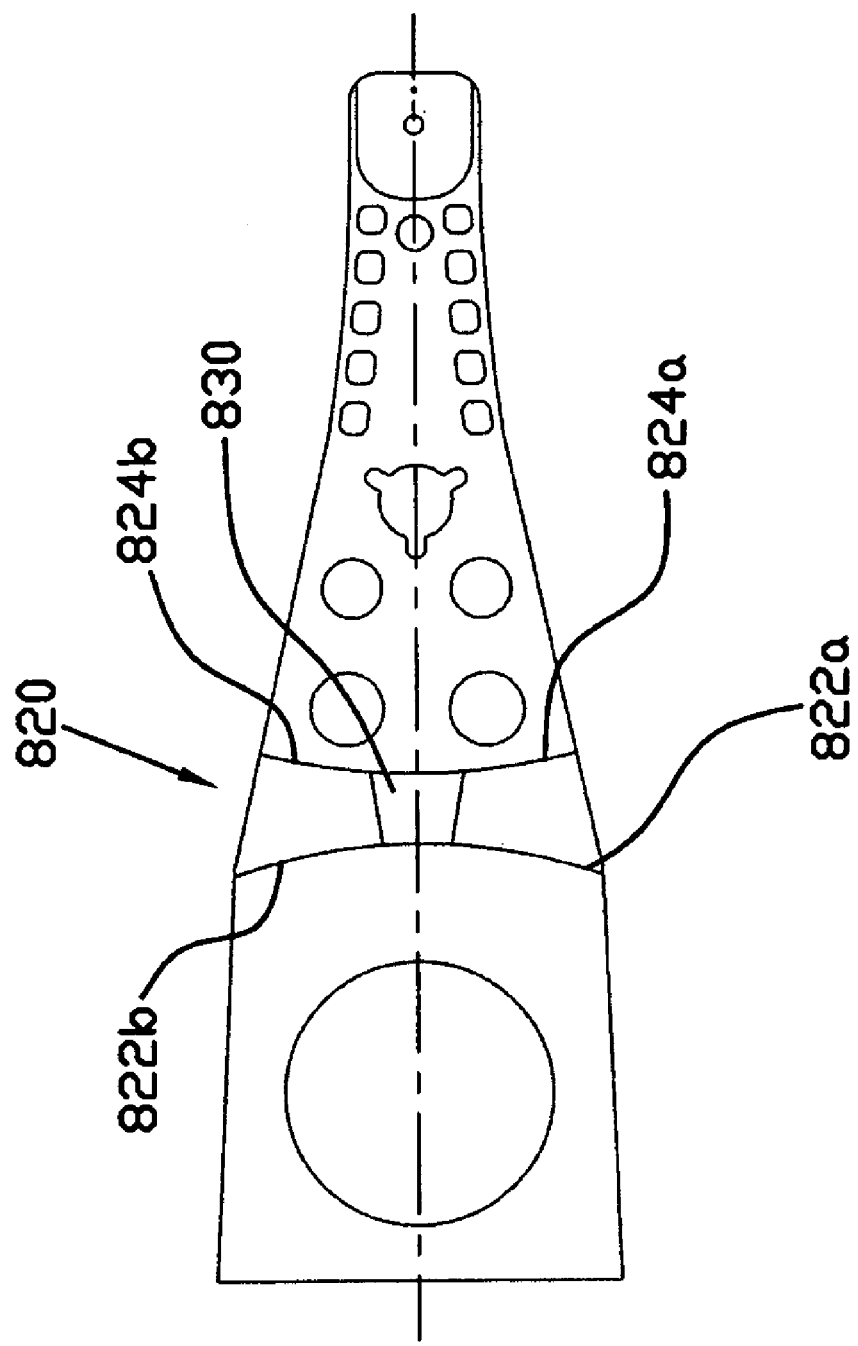
FIG. 8 schematically illustrates a head suspension in a fifth embodiment of the invention.
Figure 9:
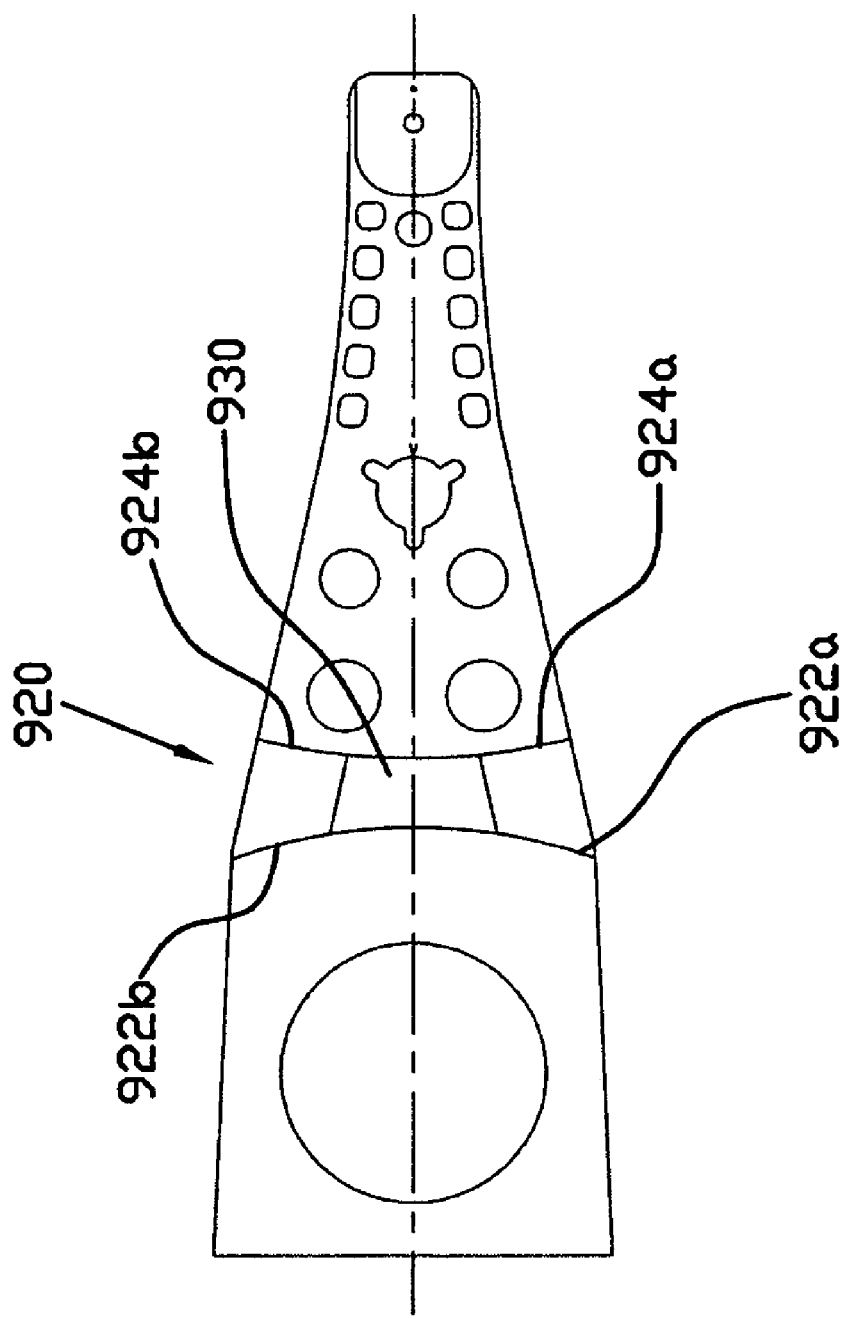
FIG. 9 schematically illustrates a head suspension in a sixth embodiment of the invention.

FIGS. 6(a) and 6(b) show, respectively, the gram load loss characteristics for the prior art suspension shown in FIG. 1 and the suspension shown in FIG. 4. At a static head height of 1.0 mm, the gram load loss is on average 0.238 g for the prior art device and 0.180 g for the device according to the invention. Load loss occurs because the stress state in the radius region exceeds the yield point of the material, typically at the weakest points, such as the edges, where the thinner regions abut the thicker regions. It is thought that the invention provides a process to make a loadbeam less prone to having such weak points (by distributing them away from the bending axis) in the radius region. It is also thought that the invention provides a more constant spring rate, which has been shown to correlate to reduced load loss.

The invention thus offers a head suspension with improved performance parameters such as lower gram load loss, smaller variability in spring constants and more desirable FRF.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A head suspension for supporting a read/write head in a dynamic rigid disk data storage device and applying a load force on the read/write head in a load direction when the storage device is in operation, the suspension comprising an elongated loadbeam portion extending along a longitudinal axis and comprising:

a mounting portion at a proximal end of the loadbeam portion for attaching the loadbeam portion to an actuating mechanism, a load portion at a distal end of the loadbeam portion for supporting an assembly configured to carry the read/write head, and a resilient spring portion connected to the mounting region at a first boundary and the load portion at a second boundary, the spring portion having a thickness that is less than thicknesses of the mounting portion and the load portion, and wherein at least a first segment of the first boundary and a second segment of the second boundary are not substantially perpendicular to the longitudinal axis, and the first segment of the first boundary and the second segment of the second boundary are generally parallel to one another.

2. The head suspension of claim 1, wherein the spring portion comprises at least a portion integrally formed with, and thinner than, the mounting region and load region.

3. The head suspension of claim 2, wherein the thinner portion comprises a partially etched portion.

4. The head suspension of claim 1, wherein the spring region comprise a material having a different elastic modulus than that of the mounting region.

5. The head suspension of claim 1, wherein the spring portion possesses a mirror symmetry with respect to a plane containing the longitudinal axis and a vector representing the load direction.

6. The head suspension of claim 1, wherein the first and second segments include concentric arcuate segments.

7. The head suspension of claim 6, wherein the respective arcuate segments in the first and second boundaries comprise circular arches.

8. The head suspension of claim 1, wherein the first and second segments include parallel linear segments.

9. The head suspension of claim 1, wherein the spring portion forms at least a part of a perimeter of an aperture in the loadbeam.

10. The head suspension of claim 1, wherein the spring portion comprises a bent portion such that the mounting portion and load portion are oriented at an angle from each other.

11. A head suspension for supporting a read/write head in a dynamic rigid disk data storage device and applying a load force on the read/write head in a load direction when the storage device is in operation, the suspension comprising an elongated loadbeam portion extending along a longitudinal axis having a bending spring rate in the load direction, the loadbeam comprising:
a rigid mounting portion at a proximal end of the loadbeam portion for attaching the loadbeam portion to an actuating mechanism,
a rigid load portion at a distal end of the loadbeam portion for supporting an assembly configured to carry the read/write head, and
a spring portion integrally formed with the mounting region and load region and having a reduced thickness than the mounting region and load region, the spring portion appreciably affecting the bending spring rate, the boundary between the spring portion and mounting portion comprising at least a first segment that is not perpendicular to the longitudinal axis, and the boundary between the spring portion and load portion comprising at least a second segment that is not perpendicular to the longitudinal axis, and wherein the first and second segments are generally parallel to one another.

12. The head suspension of claim 11, wherein the spring portion comprises a partially etched portion.

13. The head suspension of claim 11, wherein the first and second segments are arcuate segments.

14. The head suspension of claim 11, wherein each of the first and second segments comprises linear portions.

15. The head suspension of claim 14, wherein each of the first and second segments comprises a V-shaped portion.

16. The head suspension of claim 15, wherein the V-shaped portions in the first and second segments are arranged such that the apexes of the V-shaped portions offset from each other along the longitudinal axis.

17. A method of making a head suspension for supporting a read/write head in a dynamic rigid disk data storage device, the method comprising:
forming a rigid mounting portion for attachment to an actuating mechanism;
forming a rigid load portion for supporting an assembly configured to carry the read/write head; and
forming a resilient spring portion connected to the mounting portion at a first boundary and the load portion at a second boundary such that the mounting, load and spring portions form an elongated loadbeam portion extending along an longitudinal axis, including causing the spring portion to have a thickness that is less than thicknesses of the mounting portion and the load portion, and wherein the spring portion being substantially determinative of the bending spring rate of the loadbeam, a first segment of the first boundary and a second segment of the second boundary are not substantially perpendicular to the longitudinal axis, and the first segment of the first boundary and the second segment of the second boundary are generally parallel to one another.

18. The method of claim 17, wherein the steps of forming the mounting, load and spring portions comprise reducing the thickness of a first portion between a second and third portions of an elongated plate extending along a longitudinal axis, such that the second portion becomes the mounting portion, the third portion becomes the load portion, and the first portion becomes the spring portion.

19. The method of claim 18, wherein the thickness reducing step comprises etching.

20. The method of claim 19, further comprising forming an aperture on the loadbeam, with the spring portion forming at least part of the perimeter of the aperture.

* * * * *